United States Patent Office 3,541,045
Patented Nov. 17, 1970

3,541,045
COATING COMPOSITION
Harold Jabloner, Wilmington, Del., assignor to Hercules Incorporated, Wilmington, Del., a corporation of Delaware
No Drawing. Filed Mar. 7, 1968, Ser. No. 711,216
Int. Cl. C08f 45/24; C08g 51/24
U.S. Cl. 260—29.6     8 Claims

ABSTRACT OF THE DISCLOSURE

Disclosed is a coating composition useful for forming a hard normally solid coating on a surface when applied thereto. The composition comprises an aqueous solution comprising (1) polyacid material selected from the group consisting of fumaro-pimaric acid and water-soluble poly(acrylic acid), the average number of acrylic acid units in the molecules of which are in a range from about four to about the number at which the kinematic viscosity of a 5% by weight solution thereof in water at about 38° C. is about ten centistokes, (2) water-soluble poly(ethyleneimine), the number average molecular weight of which is in a range from about one thousand to about one million, at an effective concentration and (3) ammonia at least at a substantially stoichiometrically equivalent concentration relative to said polyacid material. Also disclosed are a process for making the composition, and a process for forming from the composition a hard, normally solid coating on a surface.

---

This invention comprises a coating composition and more particularly a coating composition that can be used to form a hard normally solid coating on a surface.

The composition consists essentially of a solution. The solute portion of the solution comprises (1) polyacid material selected from a special group of polyacids, (2) water-soluble poly(ethyleneimine) and (3) ammonia. The solvent portion of the solution comprises water.

The special group of polyacids consists of fumaropimaric acid and water-soluble poly(acrylic acid), the average number of acrylic acid units in the molecules of which are in a range from about four to about the number at which the kinematic viscosity of a 5% by weight solution thereof in water at about 38° C. is about ten centistokes. In one specific embodiment of the composition of this invention the water-soluble poly(acrylic acid) is the only polyacid material present. In another specific embodiment fumaropimaric acid is the only polyacid material present. In still another specific embodiment, the polyacid material is a mixture of fumaropimaric acid and water-soluble poly(acrylic acid). Fumaropimaric acid and its preparation have been reported in the literature. See 4 Am. Chem. Soc. 80, 368–70 (1958). Water-soluble poly(acrylic acid) is well known and is commercially available. It, therefore, need not be further described in detail herein.

The water-soluble poly(ethyleneimine) is characterized by a number average molecular weight (Mn) in a range from about one thousand to about one million. It is known and is commercially available.

Concentration of water-soluble poly(ethyleneimine) in the solution is an effective concentration, that is, a concentration at which a hard normally solid coating is formed when the solution is spread in a layer on a surface and the water and ammonia evaporated therefrom. If the concentration of water-soluble poly(ethyleneimine) is substantially less than or substantially greater than the optimum effective concentration, the coating formed from the composition tends to be tacky, soft and more adversely affected by water than in the case of a coating formed from a solution wherein the water-soluble poly(ethyleneimine) is at the optimum effective concentration. Usually, however, an effective concentration is obtained when the ratio of the average number of ethyleneimine units in the water-soluble poly(ethyleneimine) to the average number of acid units in the polyacid material, each molecule of fumaropimaric acid when present being treated as an acid unit, is generally in a range from about 0.5 to about 5, and preferably in a range from about 1 to about 2.5. On the other hand, higher and lower operable ratios are within the broader concepts of this invention.

The ammonia in solution is at a concentration at least substantially stoichiometrically equivalent to the concentration of the polyacid material. Preferably, it is present in stoichiometric excess. While any quantity in excess of the stoichiometric quantity can be employed, as a practical matter, because of odor and cost, the excess usually is sufficient to assure a minimum of reaction between the polyacid material and the poly(ethyleneimine) before deposition of the composition on a surface to be coated even after a reasonable period of storage with possibly some evaporative loss of ammonia.

The water concentration of the composition of this invention is generally at least sufficient to dissolve the ammonia, the polyacid material and the water-soluble poly(ethyleneimine). There is no upper limit on the water concentration, except one of practicality. Preferably, the water concentration of the solution is selected to give a viscosity deemed optimum by the formulator.

In addition to the foregoing components the composition of this invention can comprise one or more other components, examples of which include colorants, fillers, extenders, preservatives (for instance, antioxidants, ultra violet light inhibitors or absorbents, heat stabilizers, bactericides, fungicides, and the like), property improvers, and the like. The additional component or components can be water-insoluble. In such case the water-insoluble portion of the composition is generally in finely divided condition and preferably in suspension or readily suspended when the composition is stirred, and for this purpose, the composition can comprise one or more surface active agents and protective colloids as emulsifiers and emulsion stabilizers, depending on what is desired. The additional component or components can be water-soluble. Of course, there can be one or more additional components that are water-soluble and one or more additional components that are water-insoluble. It should be noted, however, that fumaropimaric acid is soluble in water only when the pH is greater than 7. Hence, when this polyacid and other components are present, care should be taken that the pH of the aqueous solution is greater than 7. This can be done by suitable adjustment of the ammonia concentration.

The composition of this invention is made by admixing the components thereof at 20–25° C. Preferably a water solution of polyacid material, ammonia and water is first formed, and then the water-soluble poly(ethyleneimine) is added to the solution which is stirred until substantially all of the poly(ethyleneimine) is dissolved therein. Thereafter, other components, if desired, can be admixed with the solution.

The composition of this invention is used by coating a surface with it, and then permitting at least the ammonia and generally the water to evaporate. As the ammonia concentration of the composition decreases below the stoichiometric level, the polyacid material and poly(ethyleneimine) chemically react to form a hard normally solid coating substantially insoluble in water.

The best mode now contemplated for carrying out this invention is illustrated by the following examples of vari-

EXAMPLE 1

This example illustrates a coating composition of this invention, based on a water-soluble poly(acrylic acid).

The formulation of this composition is:

| Components: | Parts |
|---|---|
| Water-soluble poly(acrylic acid) (5% solution in water at 100° F. has a typical kinematic viscosity of about 4.7 centistokes) | 4.2 |
| Water-soluble poly(ethylene-imine) ($M_n$=50,000) | 3.0 |
| Ammonia | 16.6 |
| Water | 42.4 |

The composition of this formulation is made by admixing 17.0 parts of a 25% aqueous solution of the water-soluble poly(acrylic acid) and 59 parts of about 58% aqueous solution of ammonium hydroxide. The resulting mixture is stirred to give a clear solution. Then 6.0 parts of a 50% aqueous solution of the poly(ethyleneimine) is admixed with it. The result is a slightly hazy appearing solution, which is the desired composition.

The composition is useful as a protective coating for floors and the like. To use the composition for this purpose, the composition is spread as a thin covering over the surface to be coated, and the ammonia and water are permitted to evaporate therefrom. Typically there is left on the surface a hard, clear, tack-free film having substantial water resistance.

EXAMPLE 2

This example illustrates a specific embodiment of the composition of this invention, which is based on fumaropimaric acid.

The formulation of this composition is:

| Components: | Parts |
|---|---|
| Fumaropimaric acid | 10.0 |
| Poly(ethyleneimine) ($M_n$=50,000) | 1.4 |
| Ammonia | 25.3 |
| Water | 66.0 |

This composition is made by admixing at 20–25° C. the fumaropimaric acid with 89.9 parts of about 58% ammonium hydroxide solution, and stirring until a clear solution is obtained. Next. 2.8 parts of a 50% aqueous solution of the poly(ethyleneimine) and the clear solution are admixed. The result, a slightly hazy solution, is the desired composition.

This composition is also useful as a protective coating for floors and the like. It is applied to floor surfaces and the like as a thin layer, and the ammonia and water permitted to evaporate therefrom. The result is typically a clear, fairly tough film. The film typically exhibits fairly good water resistance when washed with water.

Thus, this invention provides a new protective coating composition.

Other features, advantages and specific embodiments of this invention will be readily apparent to a worker exercising ordinary skill in the art after reading the foregoing disclosures. These embodiments are within the scope of this invention. In this connection, while specific embodiments of this invention have been described in considerable detail, variations and modifications of these embodiments can be effected without departing from the spirit and scope of the invention as disclosed and claimed.

What I claim and desire to protect by Letters Patent is:

1. A composition useful for forming a hard normally solid coating on a surface when applied thereto, said composition being essentially a solution, the solute portion of which comprises (1) polyacid material selected from the group consisting of fumaropimaric acid and water-soluble poly(acrylic) acid, the average number of acrylic acid units in the molecule of which are in a range from about four to about that value at which the kinematic viscosity of a 5% by weight solution thereof in water at about 38° C. is about ten centistokes, (2) water-soluble poly(ethyleneimine) having a number average molecular weight in a range from about one thousand to about one million, in an amount such that the ratio of the average number of ethyleneimine units in said poly(ethyleneimine) to the average number of acid units in the polyacid material is within the range of from about 0.5 to about 5, and (3) ammonia at a concentration at least substantially stoichiometrically equivalent to said quantity of said polyacid material, and the solvent portion of which comprises water.

2. A composition according to claim 1, wherein said water-soluble poly(ethyleneimine) has a number average molecular weight of about fifty thousand.

3. A composition according to claim 2, wherein average number of acrylic acid units in the molecules of the water-soluble poly(acrylic acid) is such that the kinematic viscosity of a 5% by weight solution thereof in water at about 38° C. is about 4.7 centistokes.

4. A process for forming a hard normally solid coating on a surface, which comprises (A) depositing on said surface a layer of a composition which is substantially a solution, the solute portion of which comprises (1) water-soluble polyacid material selected from the group consisting of fumaropimaric acid and water-soluble poly(acrylic) acid, the average number of acrylic acid units in the molecule of which are in a range from about four to about that value at which the kinematic viscosity of a 5% by weight solution thereof in water at about 38° C. is about ten centistokes, (2) water-soluble poly(ethyleneimine) having a number average molecular weight in a range from about one thousand to about one million, in an amount such that the ratio of the average number of ethyleneimine units in said poly(ethyleneimine) to the average number of acid units in the polyacid material is within the range of from about 0.5 to about 5, and (3) ammonia at a concentration at least substantially stoichiometrically equivalent to the concentration of said polyacid material, and the solvent portion of which comprises water, and (B) permitting said ammonia to evaporate therefrom.

5. A process according to claim 4, wherein said water is permitted to evaporate from said layer.

6. A process for making a coating composition, which comprises: (A) forming an aqueous solution of (1) water-soluble polyacid material selected from the group consisting of fumaropimaric acid and water-soluble poly(acrylic) acid, the average number of acrylic acid units in the molecule of which are in a range from about four to about that value at which the kinematic viscosity of a 5% by weight solution thereof in water at about 38° C. is about ten centistokes, and (2) a quantity of ammonia at least substantially stoichiometrically equivalent to the quantity of said polyacid material, and (B) admixing with said solution water-soluble poly(ethyleneimine), the number average molecular weight of which is in a range from about one thousand to about one million, the ratio of the average number of ethyleneimine units in the water-soluble poly(ethyleneimine) to the average number of acid units in the polyacid material, each molecule of fumaropimaric acid when present being treated as an acid unit, being generally in a range from about 0.5 to about 5.

7. A process according to claim 6, wherein the number average molecular weight of said water-soluble poly(ethyleneimine) is about fifty thousand.

8. A process according to claim 7, wherein the average number of acrylic acid units in the molecules of said water-soluble poly(acrylic acid) is such that the kinematic viscosity of a 5% by weight solution thereof in water at about 38° C. is about 4.7 centistokes.

References Cited

UNITED STATES PATENTS

| | | |
|---|---|---|
| 3,057,812 | 10/1962 | Straughan et al. |
| 3,093,602 | 6/1963 | Booth et al. ____ 260—29.6 XR |
| 3,280,213 | 10/1966 | Endsley et al. |
| 3,313,736 | 4/1967 | Dickson et al. |

FOREIGN PATENTS 466,270  5/1937  Great Britain.

MURRAY TILLMAN, Primary Examiner

H. ROBERTS, Assistant Examiner

U.S. Cl. X.R.

106—3; 117—161; 260—2, 29.2, 874